(12) United States Patent
Fauconnier et al.

(10) Patent No.: US 7,656,838 B2
(45) Date of Patent: Feb. 2, 2010

(54) METHOD FOR MANAGING RESOURCES IN A COMMUNICATION SYSTEM AND EQUIPMENT FOR CARRYING OUT SAID METHOD

(75) Inventors: Denis Fauconnier, St Remy les Chevreuse (FR); Sarah Boumendil, Paris (FR)

(73) Assignee: Nortel Networks Limited, St. Laurent, Qubec (CA)

( * ) Notice: Subject to any disclaimer, the term of this patent is extended or adjusted under 35 U.S.C. 154(b) by 501 days.

(21) Appl. No.: 11/660,292

(22) PCT Filed: Aug. 16, 2005

(86) PCT No.: PCT/EP2005/008849

§ 371 (c)(1),
(2), (4) Date: Feb. 14, 2007

(87) PCT Pub. No.: WO2006/018265

PCT Pub. Date: Feb. 23, 2006

(65) Prior Publication Data

US 2007/0287442 A1 Dec. 13, 2007

(30) Foreign Application Priority Data

Aug. 16, 2004 (FR) .................................. 04 08900

(51) Int. Cl.
*H04W 4/00* (2009.01)
(52) U.S. Cl. ........................ 370/329; 370/230; 370/341; 370/342; 370/343; 370/347; 455/450; 455/451; 455/452.1; 455/452.2; 455/453
(58) Field of Classification Search ................. 370/329, 370/230, 341, 342, 343, 347; 455/450, 451, 455/452.1, 452.2, 453, 509
See application file for complete search history.

(56) References Cited

U.S. PATENT DOCUMENTS 6,785,252 B1 * 8/2004 Zimmerman et al. ........ 370/337

(Continued)

OTHER PUBLICATIONS

3$^{rd}$ Generation Partnership Project, 3GPP TR 25.896 V6.0.0 (Mar. 2004) Technical Report, Technical Specification Group Radio Access Network, Feasibility Study for Enhanced Uplink for UTRA FDD (Release 6), pp. 1-26 (2004).
Ericsson, TSG-RAN WG 1 #38, Enhanced Uplink—Scheduling, pp. 1-6 (Jun. 21-24, 2004).

(Continued)

*Primary Examiner*—Kent Chang
*Assistant Examiner*—Magdi Elhag
(74) *Attorney, Agent, or Firm*—Trop Pruner & Hu, P.C.

(57) ABSTRACT

A base station ($2a, 2b, 2c$) which can communicate with radio terminals on common and dedicated channels according to specific speeds, is provided with a band-pass which is available according to the use of the common and dedicated channels in order to receive data from a radio terminal on a high-speed uplink channel. An available band-pass is determined in the base station in order to receive the data from at least one radio terminal (1) on at least one high-speed dedicated uplink channel. A first indication relating to the available band-pass is subsequently transmitted on a common downlink channel. At least one second indication relating to a percentage of the available band-pass which should not be exceeded by the radio terminal during a forthcoming transmission on said high-speed dedicated uplink channel is then transmitted independently for each radio terminal.

28 Claims, 1 Drawing Sheet

U.S. PATENT DOCUMENTS

| | | | |
|---|---|---|---|
| 6,956,834 B2* | 10/2005 | Stanwood et al. | 370/329 |
| 7,006,530 B2* | 2/2006 | Spinar et al. | 370/468 |
| 7,283,482 B2* | 10/2007 | Koo et al. | 370/252 |
| 2002/0191555 A1* | 12/2002 | Borst et al. | 370/329 |
| 2004/0219919 A1* | 11/2004 | Whinnett et al. | 455/442 |
| 2005/0249148 A1* | 11/2005 | Nakamata et al. | 370/328 |
| 2006/0239286 A1* | 10/2006 | Schneider | 370/412 |
| 2007/0042782 A1* | 2/2007 | Lee et al. | 455/450 |

OTHER PUBLICATIONS

NEC, TSG-RAN Working Group 1, Comparison of Per-UE, Per-Flow, Per-Cell Basis Signalling in Rate Scheduling, pp. 1-5 (May 10-14, 2004).

International Search Report, pp. 1-2 (Oct. 17, 2005).

China Patent Office, Chinese Office Action with English translation issued in Chinese Patent Application No. 200580034787.2, 8 pages, Aug. 21, 2009.

* cited by examiner

METHOD FOR MANAGING RESOURCES IN A COMMUNICATION SYSTEM AND EQUIPMENT FOR CARRYING OUT SAID METHOD

BACKGROUND OF THE INVENTION

The present invention relates to the management of resources in a communication system.

It finds a particular, although nonexclusive, application in a communication system of UMTS ("Universal Mobile Telecommunication System") type, using a functionality for transmitting information at high-throughput of the "FDD enhanced uplink" type.

The "FDD enhanced uplink", which is currently the subject of a standardization, is in particular described in technical specification TS 25.309, V0.2.0, "FDD Enhanced Uplink; Overall description; Stage 2 (Release 6)", published in June 2004, by the 3GPP ("$3^{rd}$ Generation Partnership Project"). This functionality makes it possible in particular to transmit information at high-throughput from a radio terminal (or UE, for "User Equipment") to one or more base stations (or "Node B"), on a dedicated transport channel called E-DCH ("Enhanced—Dedicated CHannel").

One of the specificities of the "FDD enhanced uplink" resides in the possibility, for each base station, of directly controlling the communication resources on the E-DCH, within certain limits fixed by the radio network controller (RNC). This possibility is designated by "Node B controlled scheduling" in the aforesaid technical specification TS 25.309.

Such operation differs from the management of the other communication resources, as for the conventional dedicated channels and the common channels, where it is the RNC that determines the resources to be used for each UE, possibly after negotiation with the latter.

The controlling of the E-DCH resources by the Node B makes it possible to take into account parameters available at the level of this Node B, such as an interference level estimated on the uplink channels. One thus ensures that the transmissions performed by the UEs on respective E-DCH channels do not generate interference beyond a predetermined level.

Another exemplary parameter that can be taken into account in the controlling of the resources by the Node B is the reception capacity of this Node B, that is to say the maximum throughput at reception that this Node B is capable of processing. Specifically, certain operations are performed on the signals received by a Node B to retrieve the information that they carry, such as a despreading and a decoding in particular. To conduct these operations in an effective manner, it can therefore be useful to limit the amount of information received at the Node B.

By way of example, if a Node B has a reception capacity of 6 Mbit/s and if the information transmitted on the common and dedicated uplink channels (other than the E-DCHs) bound for this Node B already represents an aggregate throughput of 2 Mbit/s, it is desirable that the sum of the transmission throughputs on all the E-DCHs bound for this Node B, each corresponding to a UE, be less than or equal to 4 Mbit/s (=6−2 Mbit/s), lest it not be possible effectively to carry out the processing operations required at the Node B and thus not retrieve all the information transmitted by the UEs.

It therefore turns out to be necessary to indicate to each UE capable of communicating on an E-DCH channel bound for a Node B, the maximum throughput that this UE is permitted to use for transmission. In the above example, if two UEs use the "FDD enhanced uplink" functionality, the Node B can request them to limit their transmission throughput to 2 Mbit/s each, or else to 4 Mbit/s for one and 0 Mbit/s for the other for example.

Given that the Node B can choose to assign a different maximum throughput for each UE, it is then appropriate to indicate this throughput to each UE in an individual manner, for example on a respective dedicated channel. However, such a mechanism is itself ressource greedy. If the information of maximum throughput to be used is transmitted by puncturing of bits on a downlink traffic channel, that is to say by replacing certain useful data bits by said information of maximum throughput, this mechanism can furthermore degrade the reception of the information transmitted on this downlink channel.

This phenomenon is accentuated by the fact that the communication resources used for the channels other than the E-DCHs, that is to say the conventional dedicated and common uplink channels, are assigned in a prior manner by the RNC. But, the use of the resources varies, in particular on the dedicated channels, so that the bandwidth available to the Node B for receiving information, within the limit of the capacities of the Node B, changes in the course of time. If one wants to profit from a maximum of throughput on the E-DCH channels, it would therefore be advisable to regularly update the throughput thresholds not to be exceeded for each UE. The signalling resulting therefrom, for example on downlink dedicated channels, can then pose a problem.

This said, neither is it desirable to limit the updates of the throughput thresholds to be applied by each UE so as to avoid overly significant signalling, since this would lead either to unnecessary restriction of the throughput and the capacity on the E-DCH channels in the case where the fixed throughput thresholds are too low, this being contrary to their objective, or to enduring degradation of the quality of reception in the case where the fixed throughput thresholds are too high.

Another problem appears furthermore when a UE is capable of transmitting data on an E-DCH channel bound for several Nodes B simultaneously, that is to say when this UE is in a macrodiversity (or "soft handover") situation.

In this case specifically, each Node B of the active set with which the UE communicates possesses its own inherent criteria, both in terms of measured interference and of reception capacity. The management of E-DCH resources being delocalized at the level of the Node B as indicated above, it is then possible that each Node B transmits to the UE a different throughput threshold not to be exceeded, without consultation with the other Nodes B of the active set. It is thus difficult for the UE to obtain the entirety of the threshold information on the part of the various Nodes B and to determine the maximum throughput that it must ultimately apply on the basis of the information received.

An object of the present invention is to alleviate the drawbacks mentioned above, by proposing management of the resources which achieves a good compromise between transmission throughput and quality of reception.

Another object of the invention is to have effective management of the resources even in a macrodiversity situation.

SUMMARY OF THE INVENTION

The invention thus proposes a method for managing resources in a communication system comprising at least one base station able to communicate with radio terminals on common channels and dedicated channels according to determined throughputs, each base station furthermore having at least one available bandwidth, as a function of the use of some at least of the common channels and of the dedicated channels according to said determined throughputs, for receiving data from at least one radio terminal on at least one high-throughput dedicated uplink channel. The method comprises the following steps in relation to at least one base station:

/a/ determining, at the base station, at least one available bandwidth for receiving data from at least one radio terminal on at least one high-throughput dedicated uplink channel;

/b/ transmitting, on a common downlink channel, a first indication relating to said available bandwidth; and /c/ transmitting, for each radio terminal independently, at least one second indication relating to a percentage of said bandwidth available not to be exceeded by said radio terminal during a next transmission on said high-throughput dedicated uplink channel.

The information which will allow the terminal to determine the maximum throughput that it will be able to use on its high-throughput dedicated uplink channel is thus transmitted to it in two stages. The two transmissions envisaged can be done independently, in particular at different rhythms. It is thus possible to transmit only an update of the first indication without modifying the percentage relating to a terminal. It is also possible to transmit a percentage indication updated for one or more terminals, without however modifying the value of the available bandwidth relating to the base station.

The available bandwidth is determined for example by taking account of a maximum reception capacity of said base station, or else of an estimated interference level, in the uplink direction, at said base station.

The transmission, for each radio terminal independently, of said second indication can be performed on a respective downlink dedicated channel.

The transmission, on a common downlink channel, of the first indication relating to said available bandwidth is advantageously performed repeatedly in successive time slots of said common downlink channel. This embodiment is particularly interesting in the case where the radio terminal is capable of being in a macrodiversity situation with several base stations, in relation to its high-throughput dedicated uplink channel.

In this case, the radio terminal will advantageously listen to each of the common channels received alternately, so as to obtain the first indication relating to said available bandwidth for each of the base stations of the active set. The maximum throughput to be applied by the radio terminal will depend on the indications received from each of the base stations of this active set.

The invention also proposes a base station of a communication system comprising means for managing resources according to the method mentioned above.

The invention furthermore proposes a radio terminal comprising means for communicating with at least one base station of a communication system and means for transmitting data to said base station on at least one high-throughput dedicated uplink channel, said base station being designed for communicating with radio terminals on common channels and dedicated channels according to determined throughputs and for determining at least one available bandwidth for receiving data from at least one radio terminal on at least one high-throughput dedicated uplink channel. The radio terminal furthermore comprises:

means for detecting, on a common downlink channel, a first indication relating to said available bandwidth transmitted by said base station;

means for receiving at least one second indication relating to a percentage of said available bandwidth transmitted by said base station; and means for determining, on the basis of said first and second indications, a maximum throughput not to be exceeded during a next transmission on said corresponding high-throughput dedicated uplink channel.

DESCRIPTION OF PREFERRED EMBODIMENTS

The invention is described hereafter in the context of a UMTS type system using the "FDD enhanced uplink" functionality for transmitting data at high-throughput in the uplink direction. This is but an example, the invention being implementable also in other communication systems.

Figure 1:
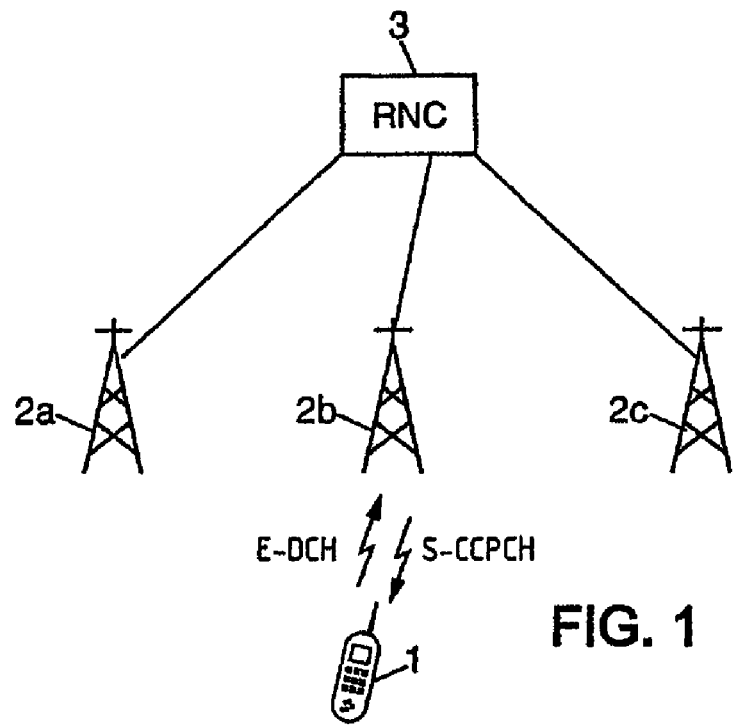
FIG. 1 is a simplified diagram of the architecture of a communication system able to implement the invention.

FIG. 1 shows a simplified exemplary architecture of the radio part of a communication system comprising three Nodes B 2a, 2b and 2c respectively, linked to an RNC 3. A UE 1 is able to communicate with some at least of the Nodes B represented. For this purpose, dedicated transport channels can be used in a conventional manner to transmit the information from the UE 1 to one or more of the Nodes B (uplink direction), or else to transmit the information from one or more of the Nodes B to the UE 1 (downlink direction). These dedicated transport channels, denoted DCH ("Dedicated CHannel") decompose into logical traffic channels DTCH ("Dedicated Traffic CHannel"), for the transmission of user data, and control channels DCCH ("Dedicated Control CHannel") for the transmission of signalling messages. Furthermore, common channels of CCCH type ("Common Control CHannel") can be used to transmit signalling messages in relation to a UE set situated under the radio coverage of a Node B.

Moreover, the UE 1 and the communication system illustrated in FIG. 1 support the "FDD enhanced uplink" functionality. Thus, the communication resources of the UE 1 are controlled directly by the Node or Nodes B with which it communicates on a dedicated high-throughput uplink channel of E-DCH type.

Figure 2:
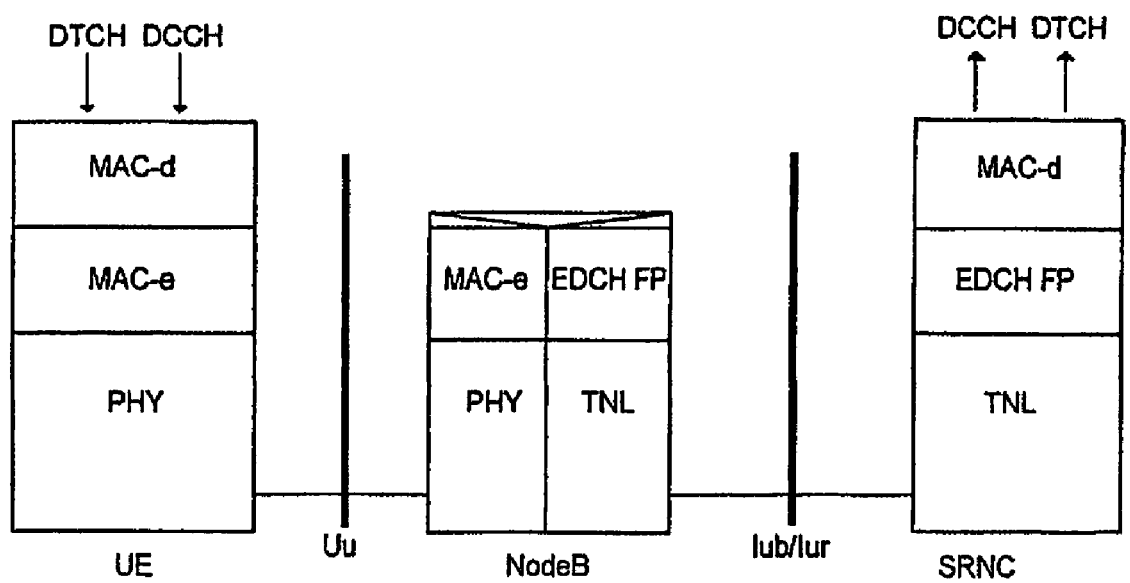
FIG. 2 is a representation as layers of communication protocols implemented in the communication system able to implement the invention.

FIG. 2 gives a representation as layers of communication protocols implemented in a system such as that of FIG. 1, in accordance with the aforesaid technical specification TS 25.309. In a conventional manner, the UE represented possesses a medium access layer (MAC-d, "Medium Access Control") which fulfills a function of multiplexing the data on the DTCH and DCCH transport channels, as well as a physical layer ("PHY") of the radio interface on which it transmits the streams emanating from the MAC-d layer to the Node B concerned. A corresponding MAC-d layer is situated in the SRNC ("Serving RNC"), that is to say the RNC controlling the connection with the UE considered, and a corresponding PHY layer is situated in the Node B with which the UE is in communication.

A MAC-e layer is furthermore used within the framework of the "FDD enhanced uplink" functionality. This layer, which controls the transmissions on the E-DCH channel, is situated in the UE and, in a corresponding manner, in the Node B. It ensures in particular the following functions:

hybrid processes for requesting retransmission of the data of HARQ type ("Hybrid Automatic Repeat reQuest"), control of the resources relating to the E-DCH channel ("scheduling") and multiplexing/demultiplexing of the data on the E-DCH. In particular, the MAC-e layer allows the selection of a transport format for the data blocks transmitted on the E-DCH channel. The transmission time interval (TTI) for the E-DCH channel is 2 ms or 10 ms.

When the UE is in a macrodiversity situation, as regards the E-DCH high-throughput channel, the SRNC ensures a reordering and a recombining of the data received from the various Nodes B of the active set.

It is considered henceforth that the UE 1 of FIG. 1 desires to transmit data at high-throughput on an E-DCH channel bound for the Node B 2b. For this purpose, the UE 1 receives communication resources, such as codes, from the RNC 3, that are configured to be able to pass a variable throughput that can attain a theoretical maximum value. As has been explained in the introduction, it is then desirable that this Node B 2b indicate to the UE 1 what maximum throughput it is assigning to it, so as to be certain that the overall uplink interference level measured at the Node B will not exceed a certain threshold and/or that the reception capacity of the Node B will not be surpassed. The UE 1 will thus be able to be induced to use the resources which have been allocated to it by the RNC 3 only within the limits fixed by the Node B 2b.

It will be noted that the available bandwidth can be determined in conjunction with a maximum reception capacity and/or an estimated uplink interference level, without however being absolutely clamped to these values. In particular, it is possible to define margins with respect to these values, so as to be certain, for example, that the uplink traffic will not have an aggregated throughput surpassing the maximum reception capacity less a predefined margin. Conversely, it is possible to define an available bandwidth beyond values mentioned above, for example when it is detected that UEs desiring to communicate on E-DCH channels have only little impact on the uplink interference level.

According to the invention, one proceeds in two stages. First of all, the Node B 2b determines an available bandwidth, that is to say a maximum throughput that it can still absorb, having regard to the information exchanges already under way on the dedicated and common channels involving this Node B.

If we return to the example mentioned in the introduction, the Node B 2b possesses a reception capacity of 6 Mbit/s, that is to say it is capable of performing a correct processing (despreading and decoding in particular) of the radio signals that it receives within the limit of an aggregate transmission throughput of 6 Mbit/s. Now, DTCH, DCCH and CCCH uplink channels controlled by the RNC 3 already use a certain bandwidth of this Node B. This use varies over time and it attains for example an overall throughput of 2 Mbit/s at a given instant considered. The bandwidth available to the Node B 2b for receiving data on E-DCH channels is therefore 4 Mbit/s (=6−2 Mbit/s) at the instant considered.

Once determined at the Node B 2b, this available bandwidth is communicated to the whole set of UEs which are situated in its radio coverage, in particular to the UE 1. This communication is carried out on a common channel, such as an S-CCPCH ("Secondary Common Control Physical CHannel"). The indication of the available bandwidth can use any type of coding, like an absolute value for example.

The calculation and the transmission on a common downlink channel of the indication relating to the available bandwidth for the Node B 2b can be performed repeatedly, for example with a period of 10 ms, as will be described in greater detail subsequently. Thus, the UE 1, like the set of the UEs under the radio coverage of the Node B 2b, obtains the information of the available bandwidth relating to the Node B 2b, on the basis of the indications received on the common downlink channel.

It will be noted that each Node B, like the Node B 2b for example, can cover several radio cells with which UEs are in communication. In this particular case, the available bandwidth can be defined at the cell level rather than at the Node B level, in particular when this bandwidth is determined with reference to an uplink interference level. The corresponding information, which can be different according to the cells under the responsibility of the Node B in question, will then be dispatched on a common S-CCPCH type channel by each cell.

Subsequently, the Node B 2b transmits a second indication to the UE 1. The latter consists substantially of a percentage. It corresponds to a fraction of the previously transmitted available bandwidth that the UE 1 must use as upper bound to its transmission throughput. The coding used to transmit the percentage information can be of any type. It is understood nevertheless that such information is of small size and can be coded on a restricted number of bits.

Returning to the preceding example, the UE 1 has first of all been informed that the bandwidth available at a given instant for the Node B 2b was 4 Mbit/s. A percentage of 50% for example is indicated to it henceforth. This signifies that the Node B 2b requests the UE 1 to send on its E-DCH channel with a transmission throughput of less than or equal to 2 Mbit/s (=50%×4 Mbit/s).

At the same time, the Node B 2b indicates to other UEs, if any, situated in its zone of radio coverage and supporting the "FDD enhanced uplink" functionality, what percentage of the previously communicated available bandwidth each of them can use. Of course, a different percentage can be indicated to each UE. For this purpose, the Node B 2b can take into account any criterion for the determination of the percentages to be allocated to the various UEs, like for example the number of UEs having or requiring an E-DCH channel, the type of service required by each UE, etc.

The transmission of the percentages is performed in an individual manner for each of the UEs concerned. For example, the percentage to be applied by each UE can be transmitted to it on a corresponding dedicated downlink channel. For this purpose, the Node B 2b can perform a puncturing on a DTCH downlink channel for example, so as to incorporate the percentage information thereinto. In this case, only a few information bits need to be punctured to transmit the percentage indication, thereby avoiding a loss of information and therefore a degradation of the quality of reception of the information transmitted on the DTCH having been the subject of the puncturing.

It will be noted that the percentage information is defined at the level of the Node B, even in the case where the Node B 2b covers several distinct radio cells. Thus, a single item of percentage information is transmitted to each UE in communication with a Node B on a respective dedicated channel.

The transmission of the percentage indication for a given UE, for example the UE 1, can be performed at a different rhythm from the transmission of the available bandwidth mentioned above. In particular, the percentage indication can be transmitted solely on the request of the UE concerned. Updates can also be dispatched by the Node B 2b when the criteria for determining such percentages undergo a change (for example a change of the number of E-DCH channels bound for the Node B).

When it has received a percentage indication, the UE 1 is then able to apply it to the indication of the available bandwidth that it has previously received, then to calculate the maximum throughput that it can use on its E-DCH channel. In the example mentioned above, where the available bandwidth transmitted by the Node B 2b is 4 Mbit/s and where the percentage returning to the UE 1 is 50%, the UE 1 deduces therefrom that it can transmit a maximum throughput of 2 Mbit/s (=50%×4 Mbit/s) on its E-DCH channel. It thereafter organizes its transmissions on its E-DCH channel so as to comply with the throughput upper bound thus calculated.

Such a two-stage transmission of the maximum throughput to be used, such as described above, presents a certain number of advantages. It makes it possible specifically to avoid transmitting very regular updates of absolute throughput values to each UE independently, which would represent a significant amount of signalling, furthermore capable of degrading the quality of reception of the useful information in particular when the throughputs are transmitted by puncturing of downlink traffic channels. By way of illustration, if the available bandwidth of the Node B 2b evolves, following a modification of the resources used on DTCH type channels for example, it will then suffice to transmit an update of this information on a common downlink channel, without having to retransmit to each UE concerned a throughput indication modified accordingly.

In an advantageous embodiment of the invention, several available bandwidths are determined by the Node B considered (or each of the cells covered by this Node B) then transmitted on a common downlink channel. These various bandwidths are chosen so as to be associated with respective service levels to be implemented by UEs. By way of example, a significant bandwidth can be reserved for the usage of the UEs having a subscription requiring a high service level, while a lower bandwidth can be used by UEs requiring a lower service level. Likewise, a significant bandwidth can be reserved for the usage of the communications having a high priority level, while a lower bandwidth can be used for communications with a lower priority level.

Moreover, the percentage values transmitted to the UEs can depend on the level of service to be implemented by these UE. Thus, a UE employing a subscription requiring a high quality of service may be assigned a significant percentage of the bandwidth, to the detriment of other UEs employing a subscription requiring a lower quality of service.

Another advantage of such a mechanism will be highlighted hereafter in an exemplary embodiment of the invention where the UE 1 is in a macrodiversity situation in relation to its E-DCH channel. It is considered therefore hereafter that the UE 1 of FIG. 1 desires to transmit data at high-throughput on an E-DCH channel bound for the three Nodes B 2a, 2b and 2c simultaneously. Such a macrodiversity situation makes it possible specifically to improve the reliability and the quality of the reception by combining the information received by each Node B of the active set.

In such a case, each Node B possesses its own inherent criteria. By way of example, the interference level in the uplink direction measured by each of the Nodes B can be different since it depends in particular on the communications under way with the corresponding Node B. Likewise, each Node B can use a receiver having an inherent reception capacity, possibly different from the other Nodes B. Furthermore, the use of the channels also varies according to the Nodes B, so that the available bandwidth can be different for each Node B at a given instant. In the example described hereafter, it is considered that at an instant of observation, the Node B 2a has an available bandwidth of 3 Mbit/s, while the Node B 2b has an available bandwidth of 4 Mbit/s and the Node B 2c has an available bandwidth of 2 Mbit/s.

The available bandwidths for each Node B of the active set with which the UE 1 is in communication must be transmitted to this UE so as to allow it to adapt its transmission throughput on the E-DCH channel accordingly, as indicated above.

For this purpose, each Node B can advantageously transmit the available bandwidth that it has determined, on a common channel, repeatedly. For example, each Node B transmits this information in eight successive time slots of an S-CCPCH. The UE 1, on its side, alternately listens to the time slots of the various S-CCPCH channels that it receives from each of the Nodes B 2a, 2b and 2c. By virtue of these repetitions, one ensures that the UE 1 will indeed obtain the available bandwidths relating to each of the Nodes B, even if it possesses only one receiver.

Of course, the repetition of the transmission of the bandwidth available by each Node B can be performed in all cases, that is to say there is or is not a UE in a macrodiversity situation.

The UE 1 can then detect and store some at least of the values received of available bandwidth, in conjunction with the corresponding Node B.

Subsequently, percentages of available bandwidth are dispatched to the UE 1 by each of the Nodes B. This information is advantageously transmitted on a downlink dedicated channel. No combining of this information is however carried out at the level of the UE 1 so that the latter can receive and determine the smallest throughput value from among the products of the percentage and of the available bandwidth that emanate from each Node B.

The UE 1 thus calculates the maximum throughput that it is permitted to use on its E-DCH channel so as not to surpass the reception capacity of each of the Nodes B. For this purpose, it can for example calculate a maximum throughput relating to each of the Nodes B and select the lowest throughput calculated. By way of example, if the percentages received respectively from the Nodes B 2a, 2b and 2c are 40%, 10% and 50%, the UE 1 then determines that the maximum throughput to be used in relation to the Nodes B 2a, 2b and 2c respectively is 1.2 Mbit/s (=40%×3 Mbit/s), 0.4 Mbit/s (=10%×4 Mbit/s) and 1 Mbit/s (=50%×2 Mbit/s). In this example, the UE 1 can then choose to use a transmission throughput of less than or equal to 0.4 Mbit/s on its E-DCH channel, so as not to surpass the reception capacity of the Node B 2b.

The invention claimed is:

1. A method for managing resources in a communication system comprising at least one base station able to communicate with radio terminals on common channels and dedicated channels according to determined throughputs, each base station furthermore having at least one available bandwidth, as a function of the use of some at least of the common channels and of the dedicated channels according to said determined throughputs, for receiving data from at least one radio terminal on at least one high-throughput dedicated uplink channel, the method comprising the following steps in relation to at least one base station:

/a/ determining, at the base station, at least one available bandwidth for receiving data from at least one radio terminal on at least one high-throughput dedicated uplink channel;

/b/ transmitting, on a common downlink channel, a first indication relating to said available bandwidth; and /c/ transmitting, for each radio terminal independently, at least one second indication relating to a percentage of said bandwidth available not to be exceeded by said radio terminal during a next transmission on said high-throughput dedicated uplink channel.

2. The method as claimed in claim 1, in which the communication system furthermore comprises a radio network controller controlling said base station, in which said radio network controller determines the throughputs for some at least of said common and dedicated channels and allocates said radio terminal resources able to pass a variable throughput on said high-throughput dedicated uplink channel.

3. The method as claimed in claim 1, in which steps /a/ and /b/ on the one hand and step /c/ on the other hand are repeated at different rhythms.

4. The method as claimed in claim 1, in which said available bandwidth is determined by taking account of a maximum reception capacity of said base station.

5. The method as claimed in claim 1, in which said available bandwidth is determined by taking account of at least one interference level estimated at said base station.

6. The method as claimed in claim 1, in which the transmission, for each radio terminal independently, of said second indication is performed on a respective downlink dedicated channel.

7. The method as claimed in claim 1, in which the transmission, on a common downlink channel, of a first indication relating to said available bandwidth is performed repeatedly in successive time slots of said common downlink channel.

8. The method as claimed in claim 7, furthermore comprising the following steps in relation to a radio terminal communicating with several base stations simultaneously:
listening alternately, at the radio terminal, to the common downlink channel relating to each of said base stations, to obtain said first indication relating to the available bandwidth for each of said base stations;
determining, at the radio terminal, on completion of step /c/, the percentage of the available bandwidth for one of said base stations, not to be exceeded by said radio terminal during a next transmission on said high-throughput dedicated uplink channel.

9. The method as claimed in claim 8, in which the determined percentage, not to be exceeded by said radio terminal during a next transmission on said high-throughput dedicated uplink channel, is that which gives the lowest value when it is multiplied with said available bandwidth for the corresponding base station.

10. The method as claimed in claim 1, in which at least two available bandwidths are determined and transmitted on a common downlink channel, each available bandwidth relating to a respective service level able to be implemented by the radio terminal.

11. The method as claimed in claim 1, in which the second indication relating to a percentage of said available bandwidth transmitted, for each radio terminal independently, depends on a service level to be implemented by said radio terminal.

12. The method as claimed in claim 1, in which said base station covers several radio cells and in which several available bandwidths for said base station are determined, each available bandwidth relating to one of said radio cells respectively.

13. A radio terminal comprising means for communicating with at least one base station of a communication system and means for transmitting data to said base station on at least one high-throughput dedicated uplink channel, said base station being designed for communicating with radio terminals on common channels and dedicated channels according to determined throughputs and for determining at least one available bandwidth for receiving data from at least one radio terminal on at least one high-throughput dedicated uplink channel, the radio terminal furthermore comprising:
means for detecting, on a common downlink channel, a first indication relating to said available bandwidth transmitted by said base station;
means for receiving at least one second indication relating to a percentage of said available bandwidth transmitted by said base station; and
means for determining, on the basis of said first and second indications, a maximum throughput not to be exceeded during a next transmission on said corresponding high-throughput dedicated uplink channel.

14. The radio terminal as claimed in claim 13, in which the transmissions, by the base station, of said first and second indication respectively are repeated at different rhythms.

15. The radio terminal as claimed in claim 13, in which the second indication is transmitted by the base station and received by said means of reception of the radio terminal on a downlink dedicated channel.

16. The radio terminal as claimed in claim 13, in which, when the high-throughput dedicated uplink channel corresponding to said radio terminal is received simultaneously by several base stations, the transmission by each base station, on a respective common downlink channel, of a first indication relating to the available bandwidth determined by said base station is performed repeatedly in successive time slots of the corresponding common downlink channel, and in which the means for detecting said first indication relating to the available bandwidth transmitted by each base station comprise means for listening alternately to the common downlink channel relating to each of said base stations respectively.

17. The radio terminal as claimed in claim 16, in which the means for determining a maximum throughput not to be exceeded during a next transmission on the corresponding high-throughput dedicated uplink channel comprise means for selecting the maximum throughput corresponding to the lowest product between each percentage and the available bandwidth of the corresponding base station.

18. The radio terminal as claimed in claim 13, in which said base station is designed for determining at least two available bandwidths, each available bandwidth relating to a respective service level, in which said means for detecting, on a common downlink channel, a first indication are able to detect a first indication for each of the determined available bandwidths, and in which the means for determining a maximum throughput not to be exceeded during a next transmission on said corresponding high-throughput dedicated uplink channel take into account the first indication detected in relation to one of said available bandwidths determined as a function of a service level to be implemented by said radio terminal.

19. A base station able to communicate with radio terminals on common channels and dedicated channels according to determined throughputs, and furthermore having at least one available bandwidth, as a function of the use of some at least of the common channels and of the dedicated channels according to said determined throughputs, for receiving data from at least one radio terminal on at least one high-throughput dedicated uplink channel, the base station comprising:
/a/ means for determining at least one available bandwidth for receiving data from at least one radio terminal on at least one high-throughput dedicated uplink channel;
/b/ means for transmitting, on a common downlink channel, a first indication relating to said available bandwidth; and
/c/ means for transmitting, for each radio terminal independently, at least one second indication relating to a percentage of said bandwidth available not to be exceeded by said radio terminal during a next transmission on said high-throughput dedicated uplink channel.

20. The base station as claimed in claim 19, the base station being controlled by a radio network controller and further comprising means for receiving from the radio network controller the throughputs for some at least of said common and dedicated channels and information relating to the resources able to pass a variable throughput on said high-throughput dedicated uplink channel for said radio terminal.

21. The base station as claimed in claim 19, in which the means /a/ and /b/ on the one hand and the means /c/ on the other hand are carried out repeatedly at different rhythms.

22. The base station as claimed in claim 19, in which the means /a/ are arranged for determining said available bandwidth by taking account of a maximum reception capacity of said base station.

23. The base station as claimed in claim 19, in which the means /a/ are arranged for determining said available bandwidth by taking account of at least one interference level estimated at said base station.

24. The base station as claimed in claim 19, in which the means /c/ are arranged for transmitting on a respective downlink dedicated channel.

25. The base station as claimed in claim 19, in which the means /b/ are arranged for transmitting repeatedly in successive time slots of said common downlink channel.

26. The base station as claimed in claim 19, in which the means /a/ are arranged for determining at least two available bandwidths and the means /b/ are arranged for transmitting, on a common downlink channel, a first indication relating to said at least two available bandwidths, each available bandwidth relating to a respective service level able to be implemented by the radio terminal.

27. The base station as claimed in claim 19, in which the means /c/ are arranged for transmitting at least one second indication which depends on a service level to be implemented by said radio terminal.

28. The base station as claimed in claim 19, covering several radio cells and in which the means /a/ are arranged for determining several available bandwidths, each available bandwidth relating to one of said radio cells respectively.

\* \* \* \* \*